(12) United States Patent
Hedin et al.

(10) Patent No.: US 8,165,169 B2
(45) Date of Patent: Apr. 24, 2012

(54) CLOCK PRIORITY CHAIN LEVEL SYSTEMS AND METHODS

(75) Inventors: John M. Hedin, Coon Rapids, MN (US); Steven B. Stuart, Eden Prairie, MN (US); Jody Forland, St. Bonifacius, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 808 days.

(21) Appl. No.: 12/326,372

(22) Filed: Dec. 2, 2008

(65) Prior Publication Data

US 2010/0135276 A1    Jun. 3, 2010

(51) Int. Cl.
*H04J 3/06* (2006.01)
(52) U.S. Cl. ........................................... 370/503
(58) Field of Classification Search .................. None
See application file for complete search history.

(56) References Cited

U.S. PATENT DOCUMENTS

| | | | |
|---|---|---|---|
| 4,148,011 A * | 4/1979 | McLagan et al. ............. 710/108 |
| 4,183,054 A | 1/1980 | Patisaul et al. |
| 4,611,323 A | 9/1986 | Hessenmüller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |
| 6,317,475 B1 * | 11/2001 | Kasurinen ..................... 375/356 |
| 6,341,149 B1 | 1/2002 | Bertacchini et al. |
| 6,711,411 B1 | 3/2004 | Ruffini |
| 6,765,863 B1 * | 7/2004 | Wakimoto et al. ............ 370/218 |
| 2002/0169844 A1 | 11/2002 | Jammes et al. |

FOREIGN PATENT DOCUMENTS

| | | |
|---|---|---|
| EP | 0391597 | 10/1990 |
| WO | 9115927 | 10/1991 |
| WO | 9835466 | 8/1998 |

OTHER PUBLICATIONS

International Searching Authority, "International Search Report", Jun. 22, 2010, Published in: WO.

(Continued)

*Primary Examiner* — Seema S Rao
*Assistant Examiner* — Wanda Russell
(74) *Attorney, Agent, or Firm* — Fogg & Powers LLC

(57) ABSTRACT

Clock Priority Chain Level Systems and Methods are provided. In one embodiment, a method for determining clock priority for a multihost unit distributed antenna system is provided. The method comprises identifying which port of a plurality of ports is receiving a reference clock signal having a highest priority Network Chain Level (NCL) value, wherein the highest priority NCL value indicates a master clock priority level (MCPL) of a host unit providing a Master Clock and a chain level value indicating a chain depth; selecting a system clock reference port from the plurality of ports based on the highest priority NCL value; locking a local clock to a reference clock signal received on the selected system clock reference port; calculating an incremented NCL value based on the highest priority NCL value; and transmitting the incremented NCL value over the plurality of ports.

20 Claims, 7 Drawing Sheets

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", , pp. 1171-1175, Publisher: IEEE.

* cited by examiner

CLOCK PRIORITY CHAIN LEVEL SYSTEMS AND METHODS

BACKGROUND

A system for wireless bidirectional communications, such as cellular telephone systems, typically includes a host unit which communicates with a base transceiver station (BTS) associated with one or more service providers that supply communication services for mobile subscribers. The host unit in turn is coupled, via coaxial cable or fiber optic connections, or radio frequency (RF) links, to one or more remote units which house the electronic and antenna systems used for wirelessly transmitting and receiving voice and/or data communications for subscribers of the service providers. A remote unit is often referred to as a radio head. These host units and remote units are commonly referred to together as a Distributed Antenna System (DAS). The simplest distributed antenna systems currently consist of one host unit and one remote unit, or one host unit and multiple remote units. In all systems, the operating frequency of all units is frequency-locked to a Master Clock. In a single host unit environment there is only one source for the Master Clock. That source is the single host. Further, if the single host unit is lost, the network is broken and no part of it can function. Multiple-host unit systems are also under consideration. In a multi-host unit environment, it can be uncertain as to which host unit is providing the Master Clock for the system, and if a host unit providing the Master Clock goes down, how other parts of the network can remain in operation.

For the reasons stated above and for other reasons stated below which will become apparent to those skilled in the art upon reading and understanding the specification, there is a need in the art for systems and methods for providing a Master Clock for a distributed antenna system with multiple host units.

SUMMARY

The Embodiments of the present invention provide methods and systems for Clock Priority Chain Level Systems and Methods and will be understood by reading and studying the following specification.

In one embodiment, a method for determining clock priority for a multihost unit distributed antenna system is provided. The method comprises identifying which port of a plurality of ports is receiving a reference clock signal having a highest priority Network Chain Level (NCL) value, wherein the highest priority NCL value indicates a master clock priority level (MCPL) of a host unit providing a Master Clock and a chain level value indicating a chain depth; selecting a system clock reference port from the plurality of ports based on the highest priority NCL value; locking a local clock to a reference clock signal received on the selected system clock reference port; calculating an incremented NCL value based on the highest priority NCL value; and transmitting the incremented NCL value over the plurality of ports.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
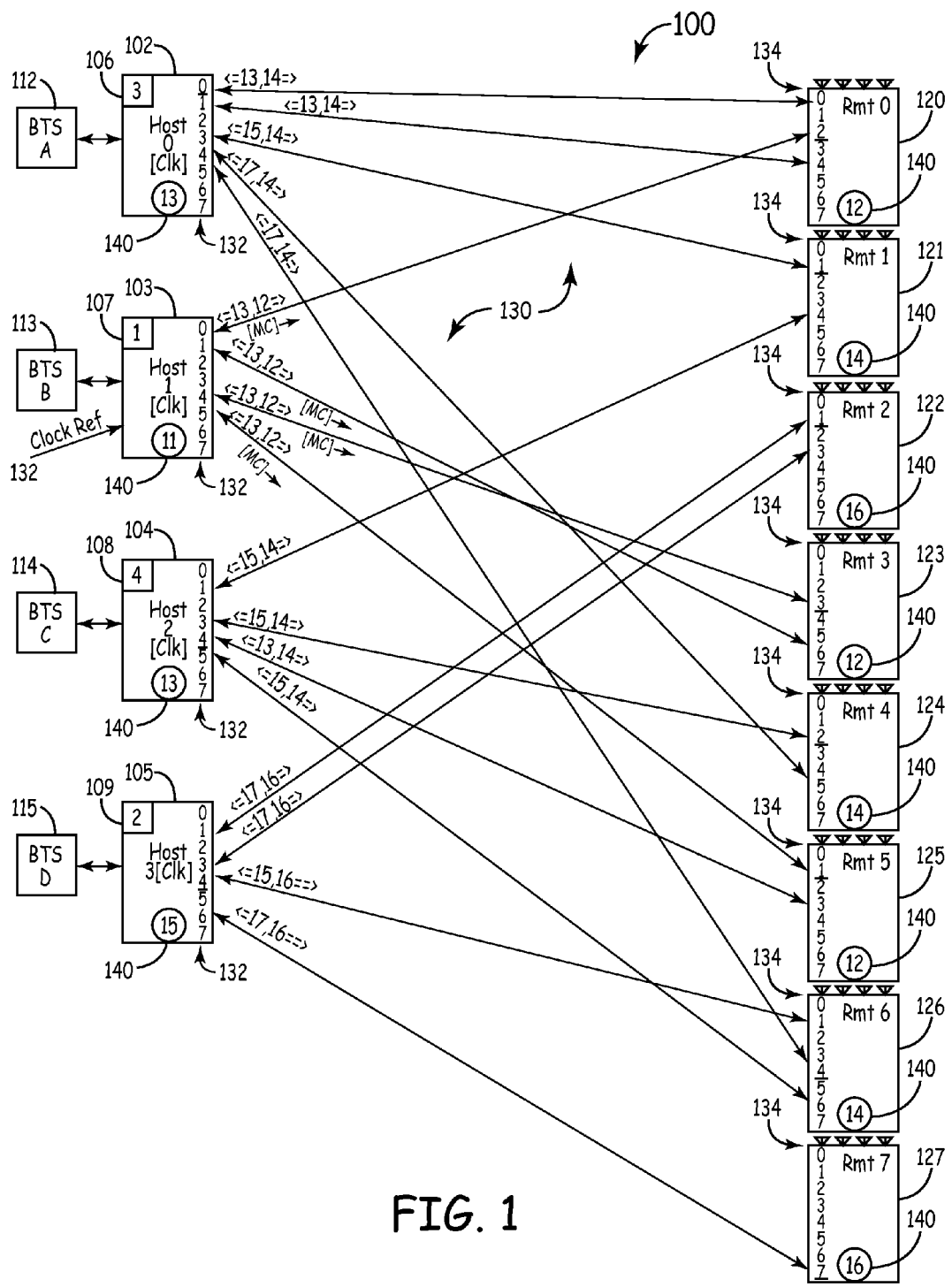
FIG. 1 is a block diagram of a multiple host unit distributed antenna system of one embodiment of the present invention.

FIG. 1 is a block diagram of a multiple host unit distributed antenna system 100 of one embodiment of the present invention. The particular distributed antenna system 100 shown in FIG. 1 comprises a plurality of host units 102, 103, 104 and 105, each coupled to a respective base transceiver station (BTS) 112, 113, 114 and 115. Each BTS 112-115 communicates voice and other data signals between the respective host unit and a larger communication network (for example, the public switched telephone network, wireless service provider networks, or the Internet). The particular distributed antenna system 100 shown in FIG. 1 also comprises a plurality of remote units shown at 121-127. At the physical layer, host units 102-105 and remote units at 120-127 are interconnected via fiber optic cable, coaxial cable, or a combination of both, to form a bidirectional communication link network comprising a plurality of point-to-point communication links shown generally at 130. In an alternate embodiment, one or more of the communication links include radio frequency (RF) links such as but not limited to a multi-GHz RF link. One of ordinary skill in the art upon reading this specification would appreciate that coaxial cable is more appropriate for a connection where a particular remote unit is a relatively short distance from a host unit. Each remote unit is coupled via a communication link 130 to one or more of the host units while each host unit is coupled via a communication link 130 to one or more of the remote units. As shown in FIG. 1, each communication link 130 connects one input/output (I/O) port from a host unit (illustrated for each host unit as ports 0-7, shown generally at 132) with one I/O port from a remote unit (illustrated for each remote unit as ports 0-7, shown generally at 134). One of ordinary skill in the art upon reading this specification would appreciate that any of the point-to-point communication links 130 may be physically implemented using either a single bidirectional media or a pair of single directional media.

As will be discussed in greater detail below, in alternate embodiments, a remote unit may further be coupled to on or more other remote units, either instead of or in addition to, one or more host units. Further, although FIG. 1 illustrates one embodiment having four host units and seven remote units, one of ordinary skill in the art upon reading this specification would appreciate that embodiments of the present invention may be practiced with multiple host unit distributed antenna systems having greater or fewer host units and remote units.

To communicate data across the communication links 130 correctly and to provide frequency stability to the remote units 120-127 RF circuits, one of ordinary skill in the art upon reading this specification would appreciate that each of remote units 120-127 and host units 102-105 must have their operating frequencies frequency-clocked to a Master Clock. What therefore arises is a need for a mechanism to determine which host unit should provide the master clock and to distribute the master clock signal through distributed antenna system 100. Accordingly, embodiments of the present invention serve to prioritize the multiple host units 102-105 as to which unit will provide the master clock, provide an algorithm to determine the point of origin for each subordinate module's reference clock, establish an adaptation system with automatic recovery in case part of the network is broken, and detect and report possible priority level conflicts.

Prioritizing Multiple Host Units

In operation, each host unit 102-105 powers up without an assigned priority level. This level is provided by software during the startup sequence via, for example, an FPGA register. This value is referred to as the Master Clock Priority Level (MCPL). Each host unit receives a different and unique MCPL value that indicates its priority level. The host units with the most reliable clocks are assigned a greater level of priority, which is indicted by the MCPL value. Each host unit will include in its transmissions to remote units an indication of its own MCPL. Until a host unit is assigned an MCPL, it will transmit an indication that that it should never be considered as a reference, such as by transmitting an MCPL of 0 or 15 for example. In the particular embodiment of FIG. 1, an MCPL will have a value from 1 to 14, with 0 and 15 being defined as invalid. This constrains the particular network of FIG. 1 to having no more than 14 host units and no more than 14 network levels. One of ordinary skill in the art would appreciate that other MCPL numbering schemes may be used in other embodiments to accommodate a larger number of host units and network levels without departing from the scope of embodiments of the present invention. Also, for the particular embodiment of FIG. 1, an MCPL having a value closer to zero is defined as indicating a host unit with a higher priority level (for example, a more reliable clock) than an MCPL having a value closer to fifteen.

For the particular distributed antenna system 100, the MCPL value assigned to each of the host units 102-105 is indicated respectively at 106-109. For example, host unit 102 has been assigned an MCPL=3, host unit 103 has an MCPL=1, host unit 104 has an MCPL=4, and host unit 105 has an MCPL=2. Once the MCPLs have been assigned to each host unit, the software's involvement ends (until a new host unit is added to the network) and all further action may be done by hardware.

Assuming there are no failures in system 100, the highest prioritized host unit will always provide the Master Clock for system 100. Accordingly, in FIG. 1, host unit 103 will provide the Master Clock (output from host unit 103 shown as [MC]) to which host units 102 and 104-105 and remote units 120-127 will synchronize by locking their operating frequencies. The lower prioritized hosts units 102 and 104-105 will never be selected unless there is a failure that prevents host unit 103 from distributing the Master Clock (such as, but not limited to, a host unit 103 shut-down or a loss of one or more communication links 130). At that point, the next highest prioritized host unit will take over. In the particular embodiment of FIG. 1, host unit 103 is provided an external clock reference signal 132 for generating the Master Clock. If a host unit has not been connected to an external reference clock such as 132, it will fall back on its own internal clock reference (shown as [Clk.], a 10 Mhz reference, for example).

Figure 2:
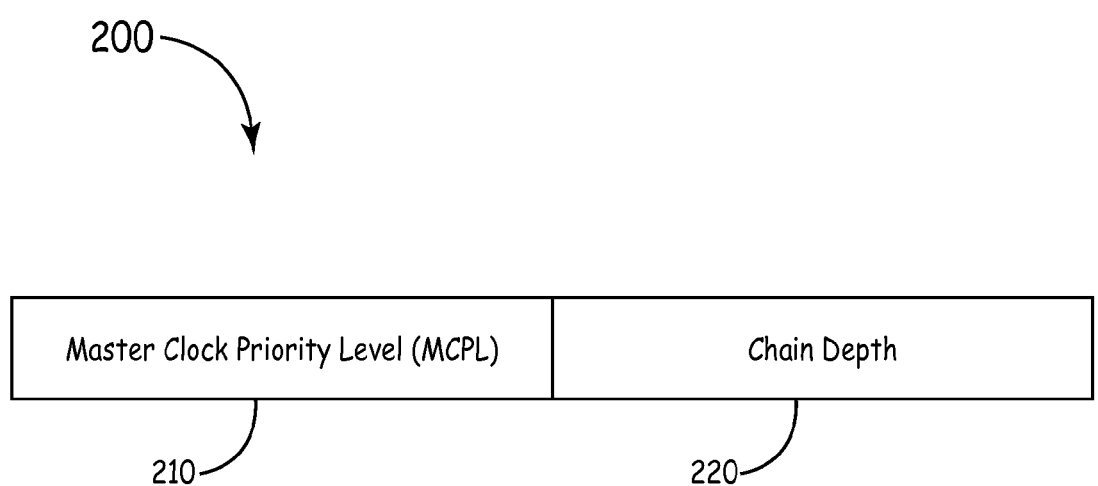
FIG. 2 is a block diagram of a Network Chain Level (NCL) value of one embodiment of the present invention.

Each host unit 102-105 and remote unit 120-127 also maintains a Network Chain Level (NCL) value, which is shown for each host unit and remote unit at 140. The NCL for each host unit and remote unit is not necessarily a unique value within the system 100 but instead indicates how far removed that particular host unit or remote unit is from the host unit currently providing the Master Clock. The Network Chain Level (NCL) value is a byte that is periodically transmitted (once per frame for example) on each outbound communication link 130 from each host unit and remote unit. FIG. 2 provides an illustration of a byte (shown generally at 200) representing one NCL value of one embodiment of the present invention. The upper nibble 210 of byte 200 indicates the MCPL of the host unit that is currently in charge of providing the Master Clock. The lower nibble 212 indicates a chain depth, that is, how far down the chain that particular host unit or remote unit is from the host unit in charge. Each host unit and remote unit determines its own NCL value, and from that NCL value, determines which of its communication links 130 to use for receiving the Master Clock. The algorithm for making this determination is described below.

NCL Algorithm

Since the individual host units 102-105 and remote units 120-127 may be powered up and down at various times, and communication links 130 added and/or removed from system 100, the NCL values will change accordingly. The time required to adapt to a change in the network depends on how deep the chain levels go. In general, it will take two frames per level to trickle down to the lowest level. For example, is the current frame duration for system 100 is 2.08 uS, it would take 29.2 uS for the propagation of NCL value calculations to be completed for a system having a depth of 14 chain level. During the propagation time, communications with some of the furthest components might experience bit errors due to clock error. During a system reconfiguration, it is possible that the NCL values for each host unit and remote unit may change as the NCL value calculations trickle down the chain. The important thing is that the system 100 will achieve stability by the end of this calculation period.

Figure 3:
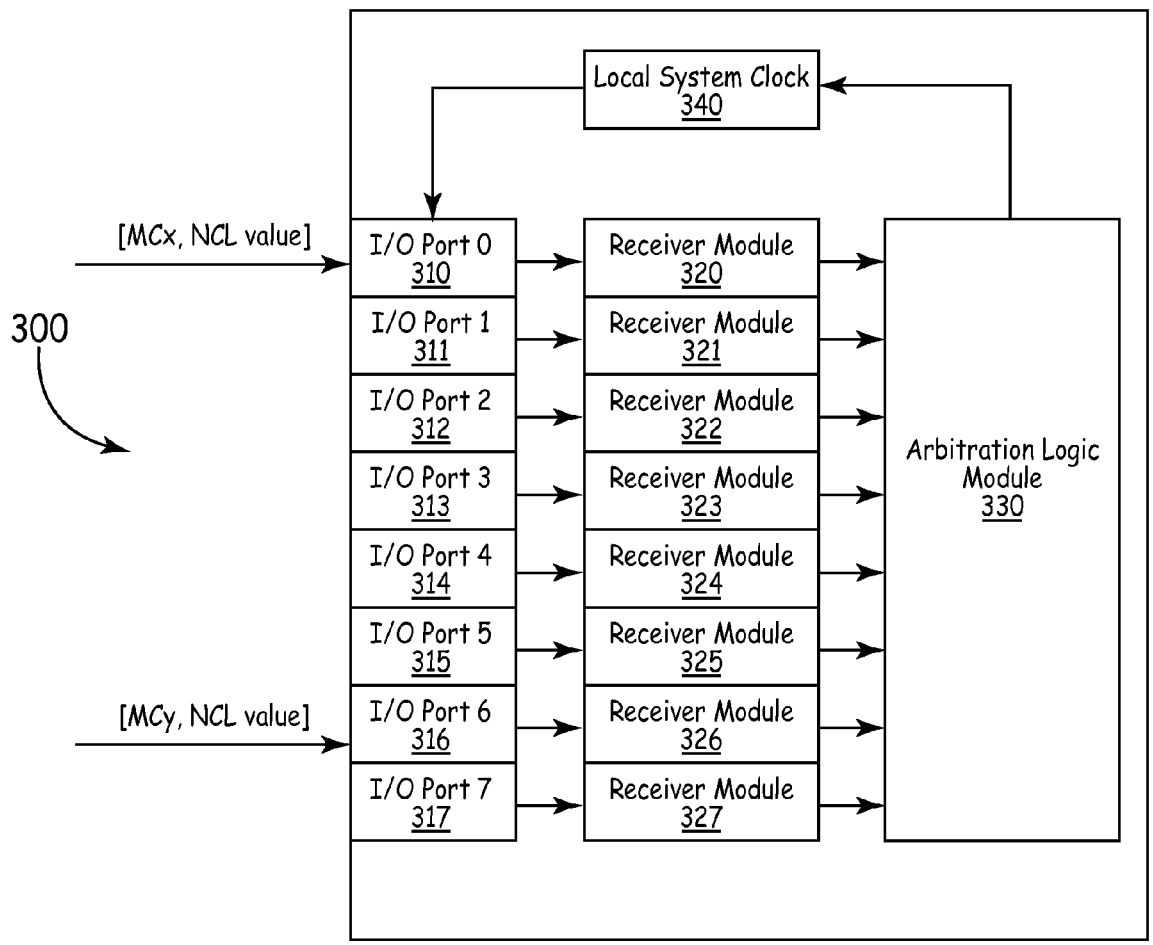
FIG. 3 is a block diagram of a system module for a multiple host unit distributed antenna system of one embodiment of the present invention.

FIG. 3 indicates a system module 300 of one embodiment of the present invention. For the purposes of this discussion, system module 300 may be either one of the host units 102-105 or remote units 120-127 discussed with respect to FIG. 1. System module 300 is shown with eight Fiber/Coax I/O ports (310-318) for communicating over one of the communications links 130. Since each of the communication links 130 are bidirectional, each port 310-318 provides an interface for accommodating both the transmission and reception of data. Each connected port receives an instance of a reference clock signal from the link along with an NCL value, which it provides to a receiver module 320-327 for that particular port. For example, as shown in FIG. 3, I/O port 0 at 310 receives a first instance of the reference clock signal [MCx] with an NCL value. Once the receiver module 320 has achieved a frame lock with the signal, the NCL value received on I/O port 0 can be read and passed to an arbitration logic module 330. System module 300's local system clock 340 will lock to the reference clock signal received on the port selected by arbitration logic module 330. Any unconnected ports are ignored. When one or more NCL values are received by arbitration logic module 330 (that is, when different NCL values are received via different ports), arbitration logic module 330 applies the process shown in the method illustrated in FIG. 4. For example, with a first instance of the reference clock signal [MCx] received on I/O Port 0 and a second instance of the reference clock signal [MCy] received on I/O Port 6, arbitration logic 330 will determine which of the two ports will be the system clock reference port based on the NCL values received with the reference clock signals. Local system clock 340 will then lock to reference clock signal received on the system clock reference port.

Figure 4:
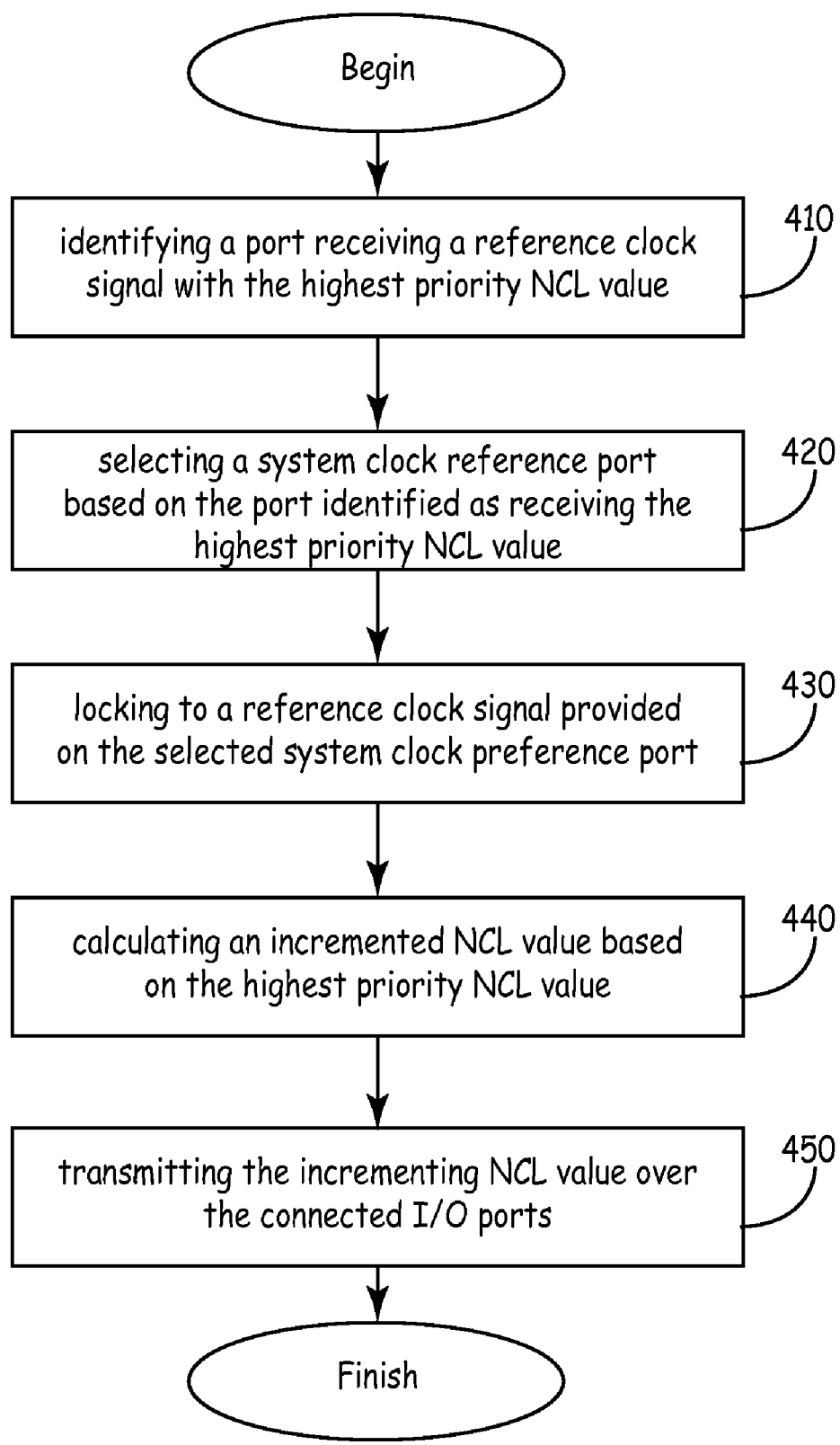
FIG. 4 is a flow chart of a method of one embodiment of the present invention.

Referring to FIG. 4, the method begins at 410 with identifying a port receiving a reference clock signal with the highest priority NCL value. The highest priority NCL value indicates a master clock priority level (MCPL) of the host unit providing the Master Clock and a chain level value indicating a chain depth. That is, arbitration logic module 330 identifies which port is receiving a reference clock signal with an NCL value indicating that its instance of the reference clock signal has traveled the fewest chain levels (that is, through the fewest communication links) from the host unit that is currently in charge of providing the Master Clock.

For Example, referring to FIG. 1, for system 100, the NCL value of host unit 103 is 11 (it has an MCPL of 1 and, since it is in charge of providing the Master Clock, is located at the $1^{st}$ chain level). Remote unit 125 will receive a reference clock signal with an NCL value of 12 from host unit 103 on port 1 and a reference clock signal with an NCL value of 14 from host unit 104 on port 3. The NCL value of 12 on port 1 indicates that remote unit 125 is receiving a reference clock signal on level 2 of the chain on port 1. The NCL value of 14 on port 3 indicates that remote unit 125 is receiving a reference clock signal on level 4 of the chain from port 3. Because the instance of the reference clock signal from port 1 has traveled the fewest number of levels to get from the host unit in charge (that is, host unit 103) to remote unit 125, arbitration logic module 330 identifies port 1 as receiving the highest priority NCL value.

The method proceeds to 420 with selecting a system clock reference port based on the I/O port identified as receiving the highest priority NCL value. If arbitration logic module 330 identifies more than one port with NCL values equal to the highest priority NCL value, the process at 420 may arbitrarily select any one of those ports. In one embodiment under such circumstances, the port having the lowest I/O port number would be selected. For example, again referring to FIG. 1, since remote unit 122 receives NCL values of 16 on both ports 1 and 3, it would arbitrarily select port 1 over port 3.

Once the system clock reference port is selected, the method proceeds to 430 with locking to a reference clock signal provided on the selected system clock reference port. This selected reference clock signal is based on the Master Clock signal generated and provided by the host unit in charge. Synchronized with the Master Clock, system module 300 now propagates the Master Clock signal to any of the other host units and remote units to which it is directly connected. The method thus proceeds to calculating an incremented NCL value (shown at clock 440) based on the highest priority NCL value, which was determined in block 410. The method proceeds to block 450, where the incremented NCL value is transmitted over communication links connected to system module 300's I/O ports 310-318. Any subordinate module that receives the incremented NCL value and selects it as its own highest priority NCL value will then have an NCL value one step lower in priority than system module 300.

For example, referring back to FIG. 1, remote unit 125 will select a highest priority NCL value of 12, which it received from host unit 103 on port 1. Remote unit 125 would therefore lock its local system clock to the reference clock signal it receives on port 1. Remote unit 125 would then calculate an incremented NCL value of 13 which it would transmit along with a reference clock signal over ports 1 and 3. Host unit 103, having an NCL value of 11, would ignore the NCL value 13 reference clock signal it receives from remote unit 125 as being lower in priority. Host unit 114 would receive the NCL value 13 reference clock signal from remote unit 125 on port 4. Using the process discussed above, host unit 114 would identify port 4 as providing the highest priority NCL value when compared to ports 1, 3 and 5, and thus select port 4 as its system clock reference port. Note that for the example embodiment of FIG. 1, underlined port numbers mark the selected system clock reference port, and the circled value shows the NCL identified as the highest priority NCL values. Note that host unit 103 is the Master Clock provider and that remote units 122 & 127 are the farthest modules removed from the Master Clock provider in system 100.

Adaptation System.

Figure 5:
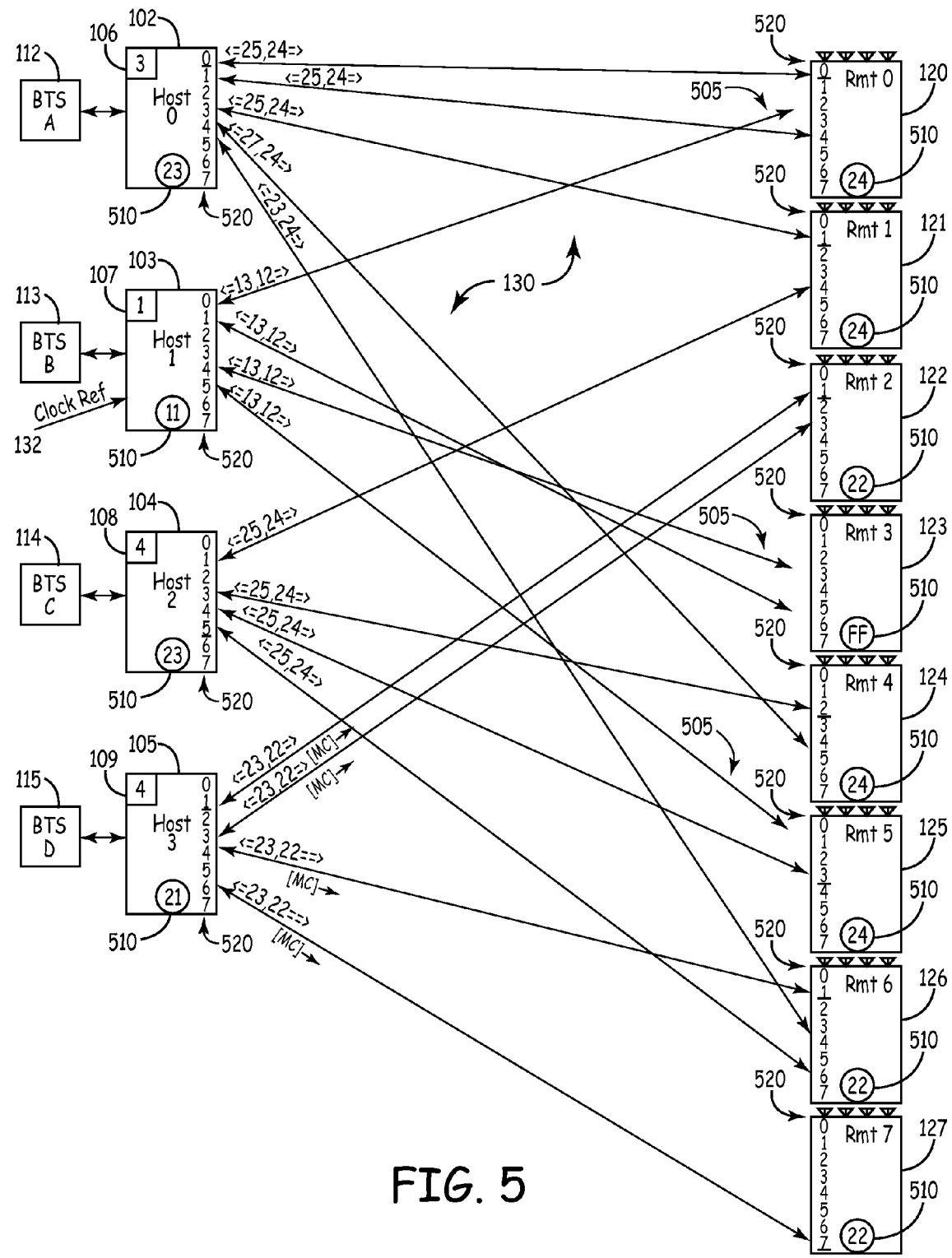
FIG. 5 is a block diagram of a multiple host unit distributed antenna system of one embodiment of the present invention.

FIG. 5 is a block diagram illustrating what would happen to the system 100 of FIG. 1 if host unit 103 were to shut down and all of its communication links broke down (shown generally at 505). In this case, host unit 105 takes over as providing the Master Clock because it has the next highest MCPL after host unit 103. Because host unit 105 has a MCPL value of 2, the upper nibble of valid NCL values would indicate that the host unit that is currently in charge of providing the Master Clock has a MCPL of 2. Host unit 105 and each subordinate module would recalculate their highest priority NCL values (shown at 510) and selected system clock reference ports (indicated generally at 520 by underlined port numbers) using the process described above with respect to FIGS. 3 and 4. Because remote unit 123 ends up with no connections at all to the rest of system 100, it will reverts to an NCL value of 0xFF. One of ordinary skill in the art would appreciate that all of the changes in NCL values and selected clock reference ports can be initiated automatically upon a failure in, or reconfiguration of, system 100. No software intervention is required other than to respond to the alarms raised by the shutdown of host unit 103. In one embodiment, when host unit 105, as the MCPL 2 host unit, detects that it is no longer receiving a valid master clock signal from the MCPL 1 host unit, it assumes the role of the host unit that is currently in charge, assigning itself an NCL value of 21, and proceeding to re-establish a priority chain as shown in FIG. 5. When and if host unit 103 returns to duty, the pattern of FIG. 1 will be resumed. Integration may be added in the receivers to prevent an intermittent port from causing thrashing.

Figure 6:
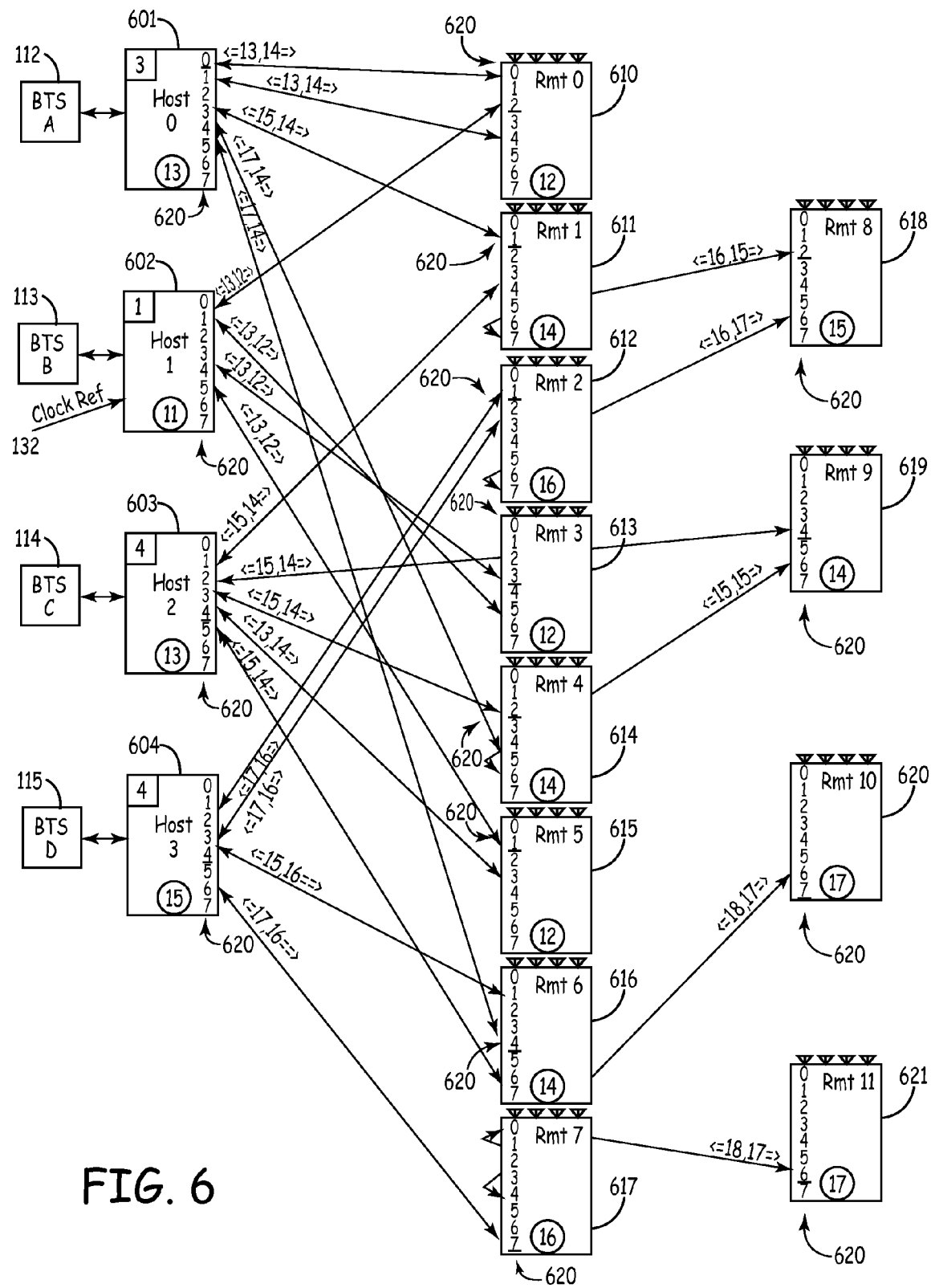
FIG. 6 is a block diagram of a multiple host unit distributed antenna system of one embodiment of the present invention.

FIG. 6 is a block diagram of a multiple host unit distributed antenna system 600 of one embodiment of the present invention illustrating the case where another layer of remote units is added. Each of the remote units 601-604 and remote units 610-621 calculate their own highest priority NCL values (shown at 610) and selected system clock reference ports (indicated generally at 620 by underlined port numbers) using the process described above with respect to FIGS. 3 and 4. FIG. 6 illustrates remote units 618-621 descending from other remote units 610-617 with remote unit 619 even descending from both host unit 603 and a remote unit 614. This embodiment is added to illustrate that the algorithm discussed above is valid in even the most extreme configuration conditions.

Until the clock priority is established, transmit and receive clocks of the various units are likely to be out of sync, which may complicate communicating MCPL & NCL information through the network. A first method to solve this problem is to initially have each host and remote unit slowly scan their receive ports, synchronizing the entire host or remote unit to each received clock, one at a time, and waiting for the clock to become stable. Once the network has achieved stability, scanning will be suspended until the network topology changes. This approach has a disadvantage in that when the network topology changes, the entire network may be disrupted until the new topology is discovered.

A second method to solve this problem involves each unit initially relying on clock frequencies from received optical signals. Each unit on the network receives an optical signal on one or more of its ports (as shown in FIG. 3, for example). The receiver module for each port receiving an optical signal will lock to a clock frequency provided by the respective optical signal. From each optical signal, the node will attempt to recover MCPL & NCL data carrier by the optical signal. Because the node is not yet synchronized to the network's master clock, the ports' communications will drift into and out of synchronization with the received optical signals. By taking advantage of those windows where a port is sufficiently synchronized to received data from the optical signal, each port has an opportunity to read the MCPL & NCL provided by each optical signal. The node can then arbitrate between the ports, as describe above, to identify the port with the highest priority NCL. Once determined, the clock frequency from this port is passed on for synchronizing the nodes local clock and synchronizing optical transmissions from the node. This approach will achieve stability quickly and will be more responsive to and less disrupted by topology changes than the first method. Once network stability is achieved, the host and remote units will all be at the same frequency.

In another embodiment, to address system initialization, each host unit initially possesses an NCL based on its provisioned MCPL level (or an invalid level if unprovisioned) and a chain depth indication of zero. Each remote unit initially possesses an NCL based on the lowest priority NCL value that is valid for that network. To initialize the network, each host unit and remote unit calculates and transmits an incremented NCL value (that is, an NCL with an incremented chain depth) as an "offer" to the other nodes of the network with which it is linked. Each node then, scans each of its ports looking for an offered NCL that is higher in priority than its own. If one or more ports offer a higher NCL value, the node accepts the offer and then proceeds as described above in FIG. 4. That is, it starts to recover its clock from the port with the highest priority NCL value. The NCL value it then starts transmitting to other nodes (that is, the incremented NCL value) is recalculated to indicate the MCPL received from the port with the highest priority NCL value. The incremented NCL value also will indicate a new chain depth which is recalculated from the highest priority NCL value to indicate one additional level of depth.

Conflict Detection

Figure 7:
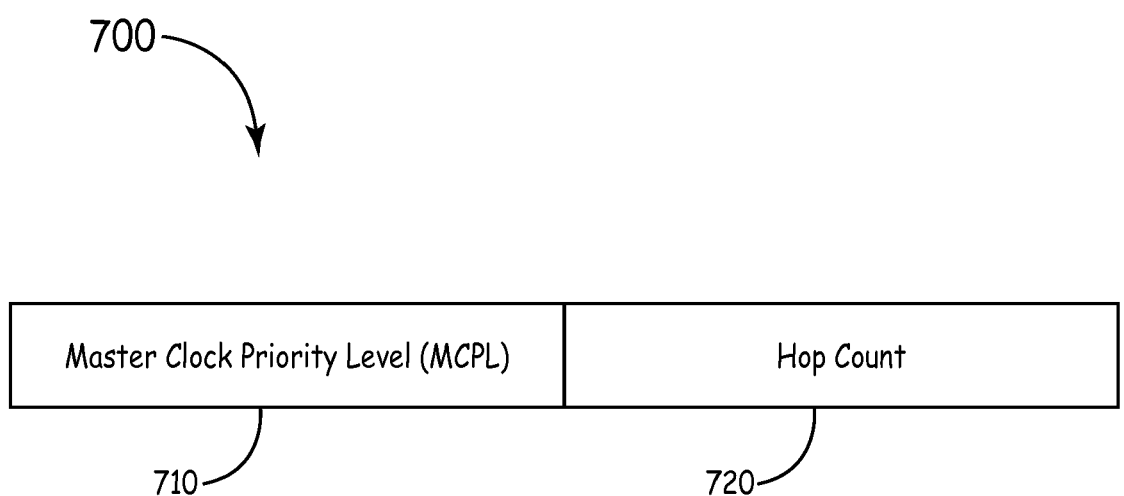
FIG. 7 is a block diagram of a Conflict Detection Byte (CDB) of one embodiment of the present invention.

Each host unit is expected to have an MCPL unique from an MCPL assigned to any other host unit. In the event that software inadvertently programs the same MCPL to multiple host units, a conflict detection scheme is also provided. If any host unit has the same MCPL as any other in a network, it will be detected as follows. A Conflict Detection Byte (CDB) will be periodically transmitted by each host unit in the communication link frame. In one embodiment, the CDB is sent autonomously at a much lower rate than the NCL, according to a pseudo-random timer so that the probability is low of any two host units transmitting a CDB at approximately the same time. As shown in FIG. 7, a CDB 700 contains the transmitting host unit's MCPL (shown at 710) and a hop-counter (shown at 720). The initial value of the hop-counter 720 is based on the maximum number of levels in the chain. Each module in the system (that is, the host unit and remote units) that receives the CDB will retransmit the CDB over each of its connected ports after decrementing the hop-counter. When the hop-counter 720 reaches zero, the retransmission of the CDB will end. Any host unit that receives a CDB that includes its own MCPL 710 (assuming it wasn't the sender) will report a Conflict Error to software. The sending host unit will have a timer that will block errors for the maximum interval that the hops could take. Software must then change the MCPL of one of the offending host units. If two conflicting host units having the same MCPL send CDBs nearly simultaneously, the conflict may not be initially detected since each transmitting host unit will assume the received CDB is the same one it sent. However, due to the action of the pseudo-random timer, the conflict will eventually be detected.

Several means are available to implement the systems and methods of the current invention as discussed in this specification. In addition to any means discussed above, these means include, but are not limited to, digital computer systems, microprocessors, programmable controllers and field programmable gate arrays (FPGAs). Therefore other embodiments of the present invention are program instructions resident on computer readable media which when implemented by such controllers, enable the controllers to implement embodiments of the present invention. Computer readable media are physical devices which include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. For example, embodiments of the present invention are not limited only to wireless telephone or distributed antenna systems but also include any network having multiple nodes that need to be locked to a single clock source. Methods described herein can also be used to detect and define a network hierarchy to identify a "path of least hops" for other types of data transfers, such as Ethernet. Also, a "path of least hops" provides an additional benefit in that the path will have no loops, which allows the techniques described herein to establish a loopless data network. Therefore, it is manifestly intended that this invention be limited only by the claims and the equivalents thereof.

What is claimed is:

1. A method for determining clock priority for, the method comprising:

identifying which port of a plurality of ports is receiving a reference clock signal having a highest priority Network Chain Level (NCL) value, wherein the highest priority NCL value indicates a master clock priority level (MCPL) of a host unit providing a Master Clock and a chain level value indicating a chain depth that represents a number of links down a chain from the host unit providing the Master Clock;

selecting a system clock reference port from the plurality of ports based on the highest priority NCL value;

locking a local clock to a reference clock signal received on the selected system clock reference port;

calculating an incremented NCL value based on the highest priority NCL value; and transmitting the incremented NCL value over the plurality of ports.

2. The method of claim 1, further comprising:
receiving a reference clock signal and an NCL value on each of the plurality of ports.

3. The method of claim 2, further comprising:
determining the highest priority NCL value based on the NCL value received on each of the plurality of ports.

4. The method of claim 3, further comprising:
re-determining the highest priority NCL value when communication with the host unit providing the Master Clock is interrupted.

5. The method of claim 1, further comprising:
determining the highest priority NCL value based on a number of point-to-point communication links through which the reference clock signal has propagated.

6. The method of claim 1, further comprising:
selecting a first host unit from a plurality of host units to be the host unit providing the Master Clock based on a relative ranking of MCPL values assigned to each of the plurality of host units.

7. The method of claim 1, further comprising
transmitting a conflict detection byte (CDB) periodically from each of the plurality of host units; and
determining when two or more of the plurality of host units have are assigned the same MCPL value based on the conflict detection byte.

8. The method of claim 7, wherein the conflict detection byte comprises the MCPL of a host unit originating the conflict detection byte and a hop-counter.

9. The method of claim 7, wherein transmitting a CDB periodically from each of the plurality of host units further comprises transmitting each CDB periodically based on a pseudo-random timer.

10. The method of claim 1, wherein identifying which port of a plurality of ports is receiving a signal having a highest priority NCL value further comprises:
selecting an port having the lowest the port designation when at least two ports receive NCL values equal to the highest priority NCL value.

11. The method of claim 1, wherein selecting a system clock reference port from the plurality of ports based on the highest priority NCL value further comprises:
locking a local system clock to the frequency signal provided on the system clock reference port.

12. A radio head component of a multihost unit distributed antenna system, the radio head component comprising:
a plurality of ports for interfacing with a network of communication links, each of the communication links providing a medium for communicating data;
an arbitration logic module responsive to the plurality of ports, wherein the arbitration logic module determines a highest priority Network Chain Level (NCL) value based on information received on the plurality of ports and selects a system clock reference port from the plurality of ports based on the highest priority NCL value, wherein the highest priority NCL value indicates a master clock priority level (MCPL) of a host unit providing a Master Clock and a chain level value indicating a chain depth that represents a number of links down a chain from the host unit providing the Master Clock; and
a local system clock for maintaining an operating frequency for communicating via the plurality of ports, the local system clock locked to a reference clock signal received via the system clock reference port selected by the arbitration logic module.

13. The radio head component of claim 12, wherein the arbitration logic module calculates an incremented NCL value based on the highest priority NCL value; and
wherein the incremented NCL value is transmitted as output from each of the plurality of ports.

14. The radio head component of claim 12, wherein the arbitration logic module selects a first port of the plurality of ports as the system clock reference port based on an NCL value received on the first port that indicates the least chain depth to the host unit providing the Master Clock.

15. The radio head component of claim 12, wherein the arbitration logic module determines the highest priority NCL value based on an NCL value received on each of the plurality of ports.

16. The radio head component of claim 12, wherein the arbitration logic module selects an port having the lowest the port designation as the system clock reference port when at least two ports receive NCL values equal to the highest priority NCL value.

17. A distributed antenna system, the system comprising:
a plurality of host units, each host unit coupled to at least one base transceiver station (BTS);
a plurality of remote units for wireless communication; and
a communication link network comprising a plurality of point-to-point communication links;
wherein a first host unit of the plurality of host units maintains a Master Clock and transmits a reference clock signal based on the Master Clock, wherein the reference clock signal based on the Master Clock is propagated through one or more of the plurality of point-to-point communication links to each of the plurality of remote units and each of the other host units of the plurality of host units;
wherein a first remote unit of the plurality of remote units arbitrates to select a system clock reference port for synchronizing with a first instance of the reference clock signal received from the communication link network based on a first Network Chain Level (NCL) value indicative of the number of point-to-point communication links through which the first instance of the reference clock signal has propagated, and wherein the first remote unit transmits an incremented NCL value back to the communication link network;
wherein a second unit of the plurality of host units arbitrates to select a system clock reference port for synchronizing with a second instance of the reference clock signal received from the communication link network based on a second Network Chain Level (NCL) value indicative of the number of point-to-point communication links through which the second instance of the reference clock signal has propagated, and wherein the second host unit transmits an incremented NCL value back to the communication link network.

18. The system of claim 17, wherein the first remote unit of the plurality of remote units comprises:

a plurality of ports, wherein at least one port of the plurality of ports is coupled to the communication link network by at least one of the plurality of point-to-point communication links;

an arbitration logic module responsive to the plurality of ports, wherein the arbitration logic module determines a highest priority NCL value based on NCL values received on the plurality of ports and selects the system clock reference port from the plurality of ports based on the highest priority NCL value; and a local system clock for maintaining an operating frequency for communicating via the plurality of ports, the local system clock locked to a reference clock signal received via the system clock reference port selected by the arbitration logic module.

19. The system of claim 17, wherein a first host unit of the plurality of host units comprises:

a plurality of ports, wherein at least one port of the plurality of ports is coupled to the communication link network by at least one of the plurality of point-to-point communication links;

an arbitration logic module responsive to the plurality of ports, wherein the arbitration logic module determines the highest priority NCL value based on NCL values received on the plurality of ports and selects the system clock reference port from the plurality of ports based on the highest priority NCL value; and a local system clock for maintaining an operating frequency for communicating via the plurality of ports, the local system clock locked to a reference clock signal received via the system clock reference port selected by the arbitration logic module.

20. The system of claim 17, wherein each of the a plurality of host units stores a unique MCPL value;

wherein the reference clock signal transmitted by the first host unit further includes an NCL value indicative of the MCPL value of the first host unit.

* * * * *